United States Patent [19]
Kaya

[11] Patent Number: 5,289,393
[45] Date of Patent: Feb. 22, 1994

[54] PORTABLE ELECTRONIC APPARATUS

[75] Inventor: Shuuji Kaya, Yamatokoriyama, Japan

[73] Assignee: Sharp Kabushiki Kaisha, Osaka, Japan

[21] Appl. No.: 924,560

[22] Filed: Aug. 4, 1992

[30] Foreign Application Priority Data

Aug. 6, 1991 [JP] Japan .................................. 3-196483

[51] Int. Cl.$^5$ ........................ G06F 15/16; G06F 3/00
[52] U.S. Cl. ............................ 364/705.08; 364/710.01
[58] Field of Search ...................... 364/705.06, 705.08, 364/708, 709.04, 709.14, 710.01, 710.03, 710.04, 710.07, 715.01, 706, 710.1; 368/41; D18/7

[56] References Cited

U.S. PATENT DOCUMENTS

| | | | |
|---|---|---|---|
| 4,152,768 | 5/1979 | Kuriya ............................ | 364/705.08 |
| 4,780,839 | 10/1988 | Hirayama ....................... | 364/710.01 |
| 4,866,611 | 9/1989 | Cree et al. ...................... | 364/705.08 |
| 5,220,540 | 6/1993 | Nishida et al. ................. | 368/41 |

FOREIGN PATENT DOCUMENTS 64-18356  1/1989  Japan .
2-89152   3/1990  Japan .
2-89153   3/1990  Japan .

OTHER PUBLICATIONS

Best General Merchandise Catalog 1989/1990.

Primary Examiner—Jerry Smith
Attorney, Agent, or Firm—Nixon & Vanderhye

[57] ABSTRACT

A portable electronic apparatus includes a display having a display portion; a memory for storing a plurality of application programs and a calendar application program and; a processor for specifying a position indicated by a cursor displayed on the display portion in operating one of the plurality of application programs, for starting up the calendar application program in operating one of the plurality of application programs, for displaying a calendar which includes a plurality of date data on the display portion in operating the calendar application program, for selecting one of the plurality of date data of the calendar, and for displaying the selected date data of the calendar at the specified position indicated by the cursor on the display portion.

4 Claims, 13 Drawing Sheets

PORTABLE ELECTRONIC APPARATUS

BACKGROUND OF THE INVENTION

1. Field of the Invention:

The present invention relates generally to a portable electronic apparatus, commonly called "electronic organizer" or "electronic memo". More particularly, the present invention relates to a portable electronic apparatus incorporating various application programs, such as a calendar, a calculator, a memo, and a schedule organizer.

Figure 9:
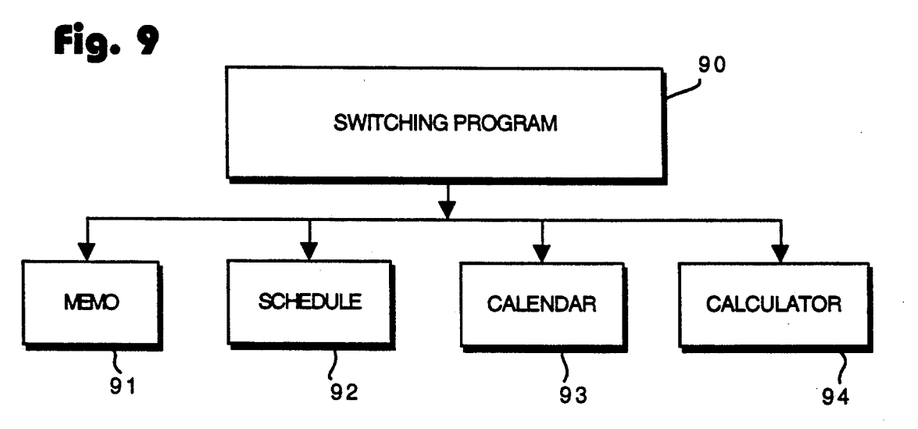
FIG. 9 is a diagram showing a calling relationship between applications in a conventional electronic organizer.

2. Description of the Prior Art:

FIG. 9 shows an exemplary calling relationship between various kinds of application programs stored in the ROM of a conventional electronic organizer. Hereafter, an application program is simply referred to as an application. A switching program 90 selectively calls one of a memo application 91, a schedule application 92, a calendar application 93 and a calculator application 94 under the control of a CPU according to an instruction of an operator.

Figure 10:
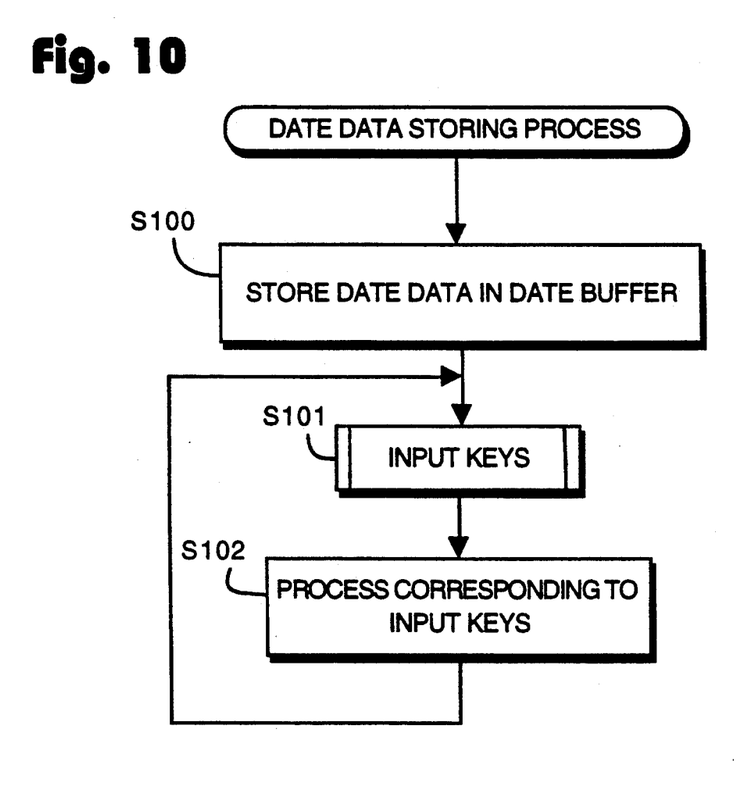
FIG. 10 is a flowchart showing the process for storing data data in a data buffer in the conventional electronic organizer.

Conventionally, when an operator utilizes date data from the calendar application 93 in one of the other applications such as the schedule application 92, there exists the following method including the steps (1) and (2):

(1) FIG. 10 shows a step of previously storing date data in a specified area (a date buffer) of a RAM.

Specifically, the calendar application previously stores date data in a specified area of a RAM (step S100) and then executes a process corresponding to a key input (steps S101, S102).

Figure 11:
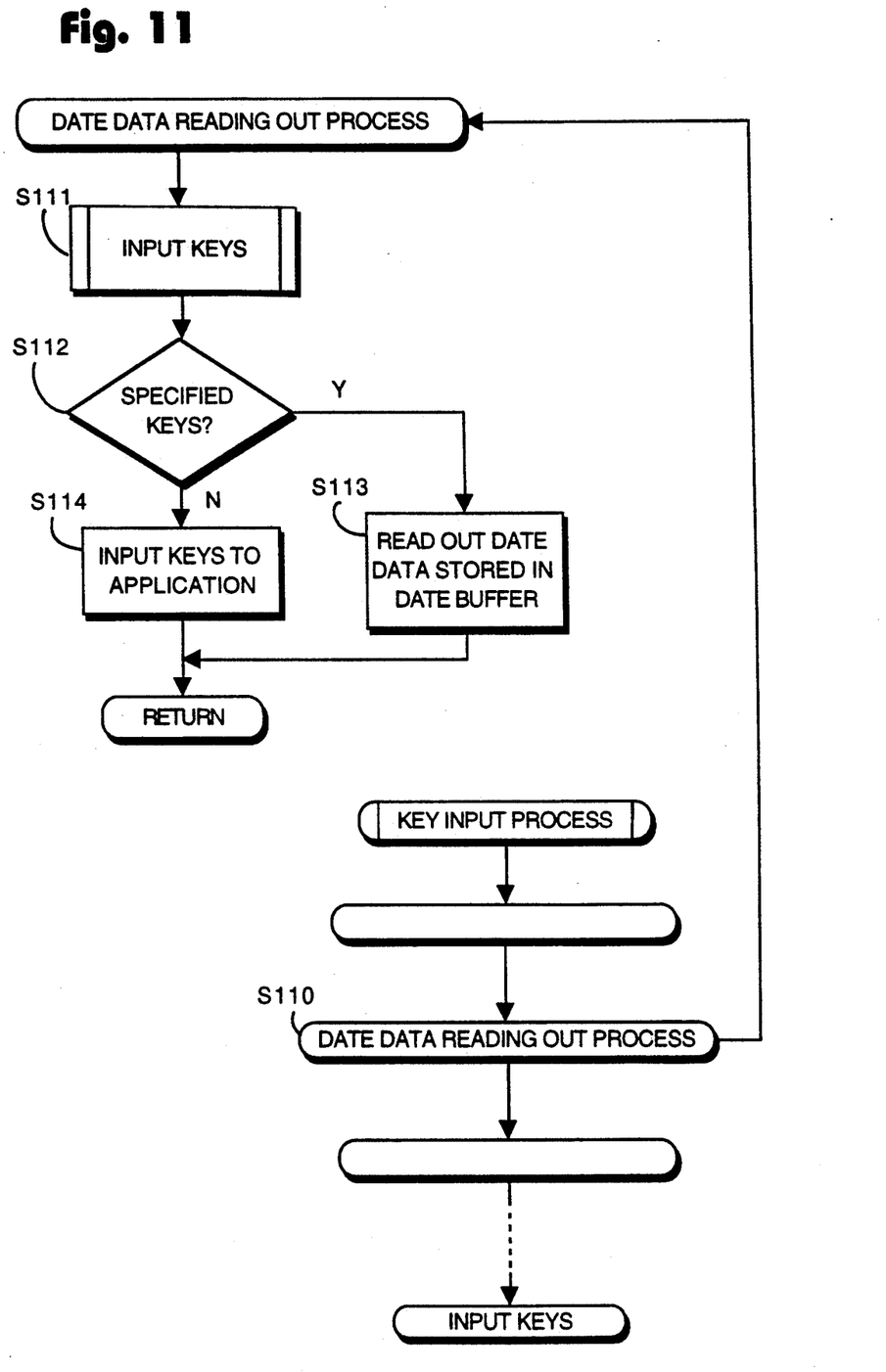
FIG. 11 is a flowchart showing the process for reading out data data stored in the data buffer in the conventional electronic organizer.

(2) FIG. 11 shows a step of reading out the date data stored in the specified area of the RAM to utilize the date data in one of the other applications.

Specifically, any application can call a date data read out process. When an application calls the date data read out process (step S110), the application allows an operator to input keys (step S111) and judges whether specified keys, such as a "SHIFT" key and a "T" key, are input or not (step S112). If Yes, the application reads out the date data stored in the specified area of the RAM to utilize the date data as a key input to the application (step S113). If No, the keys input in step S111 are input to the application (step S114).

The key input subroutine for date data is incorporated in any of the applications as one of the subroutines which can be called from any application.

Figure 12:
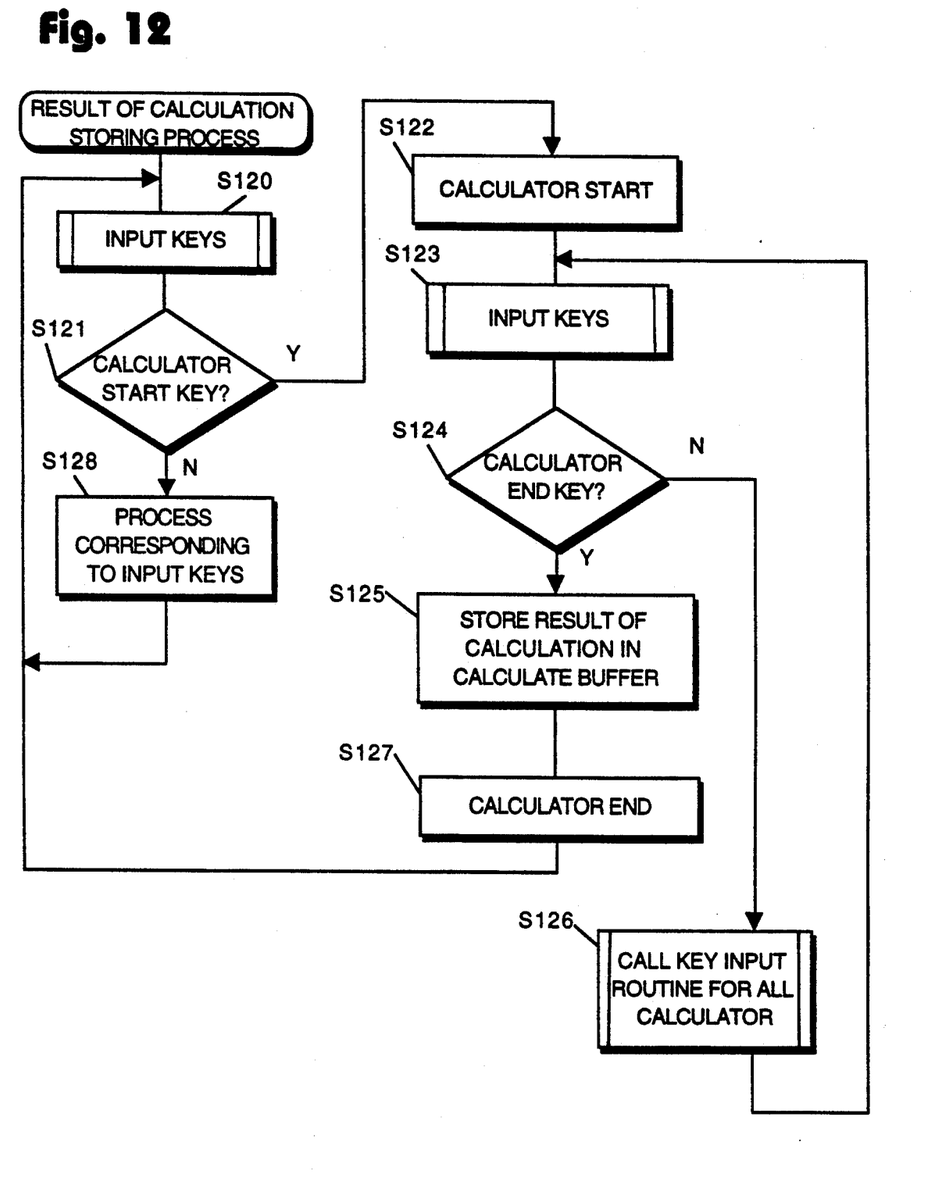
FIG. 12 is a flowchart showing the process for storing a result of calculation in a calculate buffer in the conventional electronic organizer.

Conventionally, when an operator utilizes a result of calculation from the calculator application 94 in one of the other applications, for example, the memo application 91, there exists the following method including the steps (3) and (4):

(3) FIG. 12 shows a step of previously storing a result of a calculation in a specified area (a calculate buffer) of the RAM.

Specifically, the calculator application 94 allows an operator to input keys (step S120) and judges whether a calculator start key is input or not (step S121). If Yes as in step S121, the calculator application 94 becomes a ready state for calculation (step S122). Then, the calculator application 94 allows an operator to input keys (step S123) and judges whether a calculation end key is input or not (step S124). If No as in step S124, the calculator application 94 calls a subroutine for calculation to obtain a result of the calculation (step S126) and returns to step S123. If Yes as in step S124, the calculator application 94 stores the result of the calculation in a specified area of the RAM (step S125) and terminates the calculation (step S127). If No as in step S121, the calculator application 94 executes a process corresponding to the keys input in step S120 (step S128) and returns to step S120.

Figure 13:
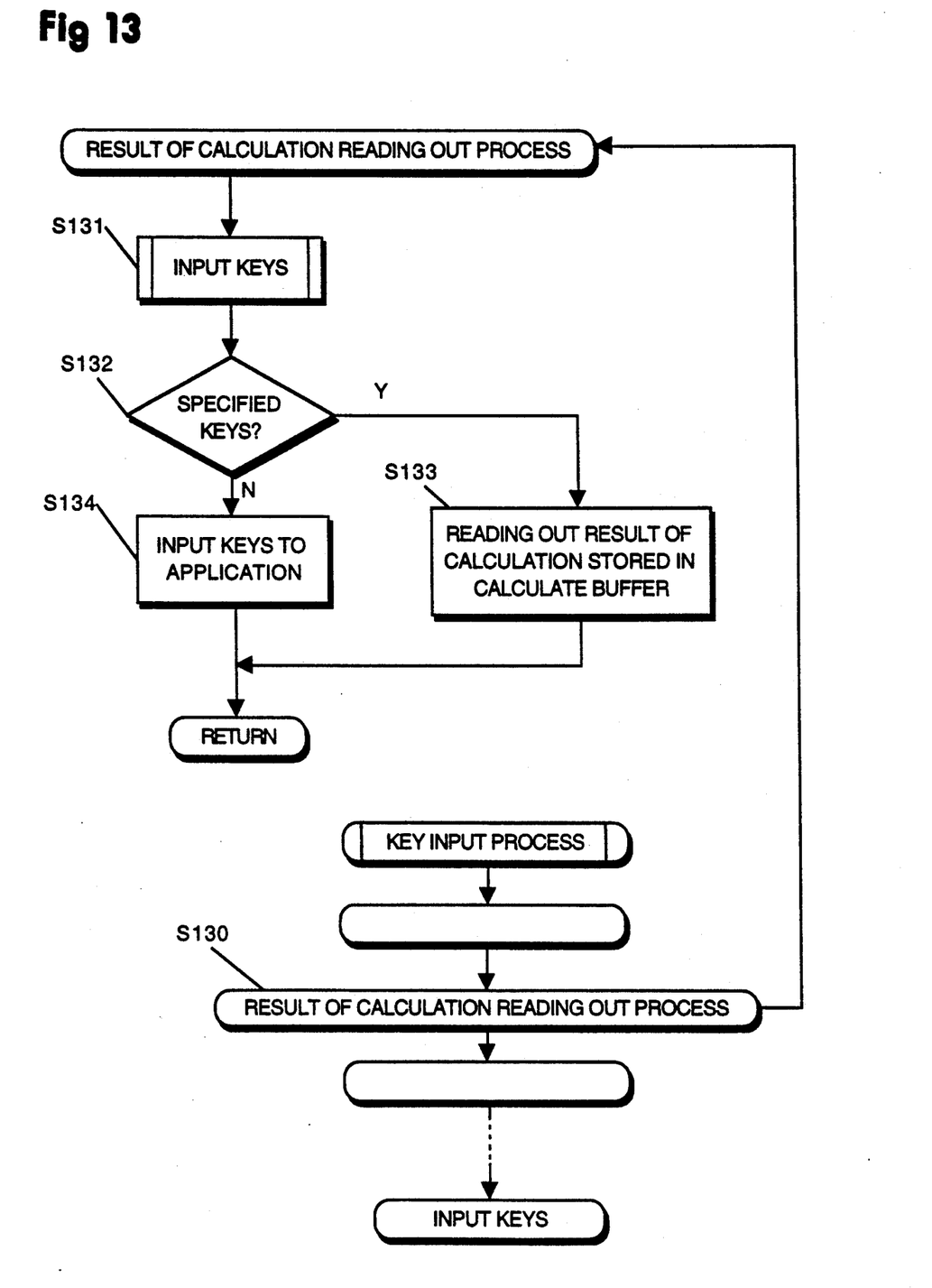
FIG. 13 is a flowchart showing the process for reading out a result of calculation stored in the calculate buffer in the conventional electronic organizer.

(4) FIG. 13 shows a step of reading out the result of a calculation stored in the specified area of the RAM to utilize the result of the calculation in one of the other applications.

Specifically, any application can call a result of calculation read out process. When an application calls the result of calculation read out process (step S130), the application allows an operator to input keys (step S131) and judges whether specified keys, such as a "SHIFT" key and an "R·CM" key, are input or not (step S132). If Yes, the application reads out the result of the calculation stored in the specified area of the RAM to utilize the result of the calculation as a key input to the application (step S133). If No, the keys input in step S131 are input to the application (step S134).

The key input subroutine for the result of the calculation is incorporated in any application as one of the subroutines which can be called from any application.

However, the conventional method including the steps (1) and (2) mentioned above has the following disadvantages:

Any application must be designed and programmed so that they can read out date data stored in the specified area of the RAM.

Further, date data must be previously stored in a specified area of the RAM before an operator wants to utilize the date data from the calendar application in any of the other applications. As a result, flexibility of operations by the operator is restricted.

For example, assuming that when an operator is operating the memo application, the operator wants to utilize the date data from the calendar application after the operator ensures a day of week of the date and/or his or her schedule referring to a calendar displayed on the display portion of the electronic organizer by the calendar application.

According to the conventional method, the operator must previously store the date data by the use of calendar application prior to starting up the memo application. Otherwise, the operator can not utilize the date data from the calendar application in the memo application. As a result, when the date data is not stored, the operator is obliged to input a provisional date to the memo application and to edit the provisional date into an appropriate date at a later stage.

Thus, the operator can not input desired date data from the calendar application to one of the other applications directly at any time, without preparing to store the date data in the calendar application.

Similarly, the conventional method including the steps (3) and (4) mentioned above has the following disadvantages:

Any applications must be designated and programmed so that they can read out a result of the calculation stored in the specified area of the RAM.

Further, a result of calculation must be previously stored in a specified area of the RAM before an operator can utilize the result of the calculation from the calculator application in any of the other applications. As a result, flexibility of operations by the operator is restricted.

For example, assuming that an operator who is operating the memo application wants to utilize numeral data, such as a result of a calculation, he or she can obtain it by using the calculator application.

According to the conventional method, the operator must previously store the result of calculation by the use of calculator application prior to starting up the memo application. Otherwise, the operator can not utilize the result of calculation from the calculator application in the memo application. As a result, when the result of calculation is not stored, the operator is obliged to input a provisional result to the memo application and to edit the result into an appropriate result at a later stage.

Thus, the operator can not input a desired result of calculation from the calculator application to one of the other applications directly at any time, without preparing to store the result of calculation in the calculator application.

SUMMARY OF THE INVENTION

The portable electronic apparatus of this invention includes a display having a display portion; a memory for storing a plurality of application programs and a calendar application program and; a processor for specifying a position indicated by a cursor displayed on the display portion in operating one of the plurality of application programs, for starting up the calendar application program in operating one of the plurality of application programs, for displaying a calendar which includes a plurality of date data on the display portion in operating the calendar application program, for selecting one of the plurality of date data of the calendar, and for displaying the selected data data of calendar at the specified position indicated by the cursor on the display portion.

According to another embodiment of the present invention, the portable electronic apparatus includes a display having a display portion; a memory for storing a plurality of application programs and a calculator application program and; a processor for specifying a position indicated by a cursor displayed on the display portion in operating one of the plurality of application programs, for starting up the calculation application in operating one of the plurality of application programs, for displaying a result of the calculation obtained by the calculator application program on said display portion, and for displaying the result of calculations at the specified position indicated by the cursor on the display portion.

Thus, the invention described herein makes possible the advantage of continuing to input data with ease, and enhancing the versatility of a portable electronic apparatus.

These and other advantages of the present invention will become apparent to those skilled in the art upon reading and understanding the following detailed description with reference to the accompanying figures.

DESCRIPTION OF THE PREFERRED EMBODIMENTS

Example 1

Figure 1:
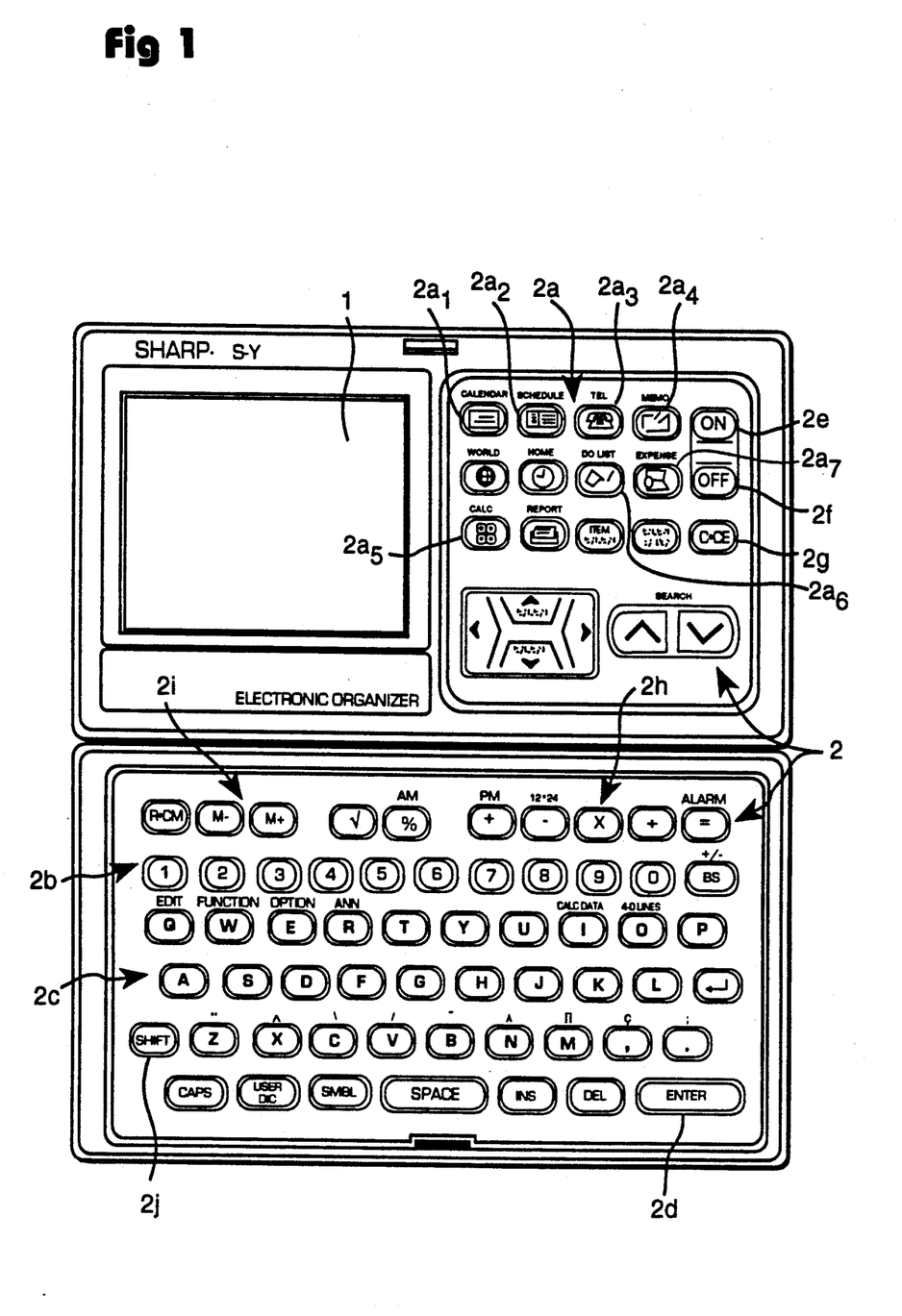
FIG. 1 is a plan view showing an electronic organizer according to the present invention in its open state.

FIG. 1 shows a plan view of an exemplary electronic organizer as a portable electronic apparatus of the present invention. The electronic organizer includes a display portion 1, such as a liquid crystal display panel (LCD), an entry key section 2 including application entry keys 2a, number entry keys 2b, alphabetical entry keys 2c, an ENTER key 2d for storing entered characters, figures and dates, an ON switch 2e, an OFF switch 2f, a C·CE key (clear key) 2g for clearing the data in a key input buffer, arithmetic function keys 2h, memory keys 2i, and a SHIFT key 2j.

The application entry keys 2a include a CALENDAR key (calendar mode key) $2a_1$, a SCHEDULE key (schedule mode key) $2a_2$, a TEL key (telephone mode key) $2a_3$, a MEMO key (memo mode key) $2a_4$, a CALC key (calculation mode key) $2a_5$, a DO LIST key $2a_6$, and an EXPENSE key $2a_7$.

Figure 2:
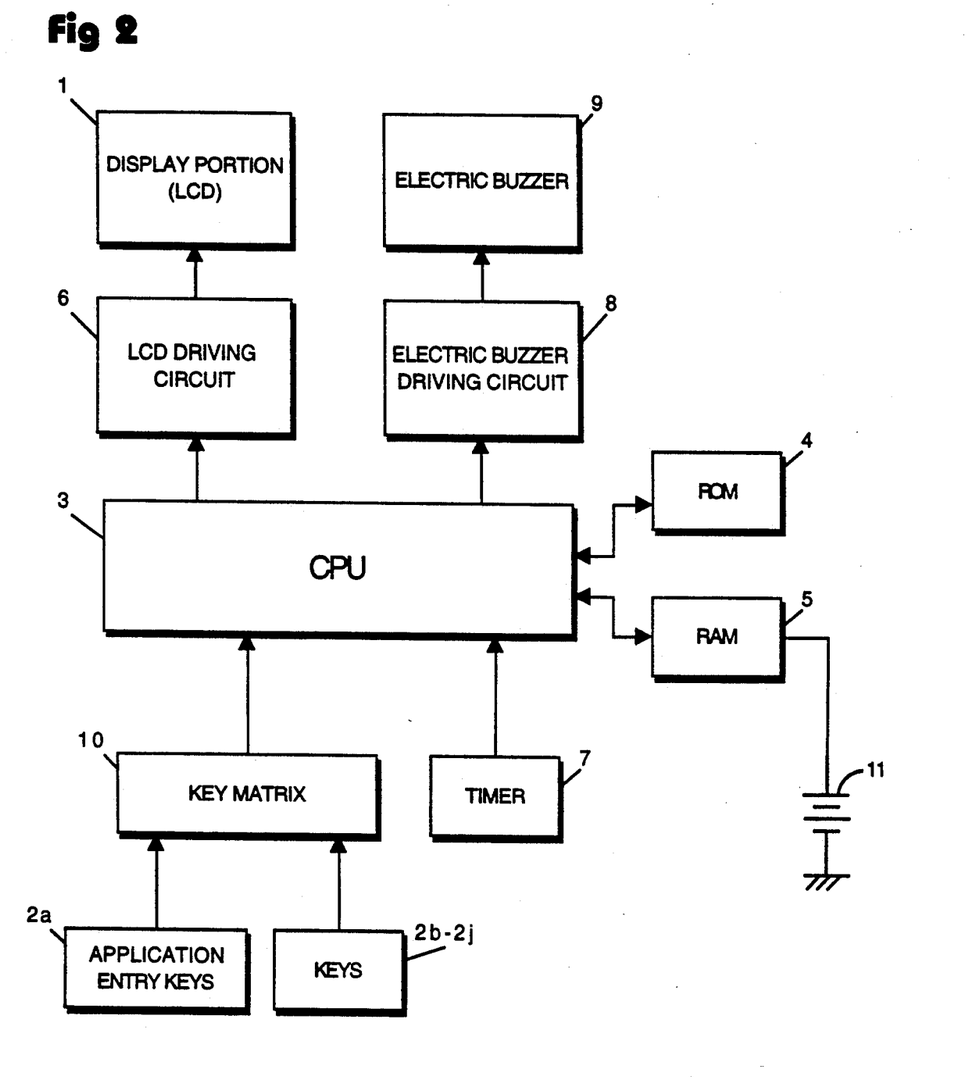
FIG. 2 is a block diagram showing the electric configuration of the electronic organizer shown in FIG. 1.

FIG. 2 shows the electric configuration of the electronic organizer. The electronic organizer includes a central processing unit (CPU) 3 which controls all operations of the system; a read-only memory (ROM) 4 for storing various kinds of applications, a calendar for the calendar application, various functions and constants; a random access memory (RAM) 5 as a working memory for the CPU 3 and user memory; a driving circuit 6 for driving the liquid crystal in the display portion 1; a timer 7 usable as a clock; an electric buzzer driving circuit 8; an electric buzzer 9 for generating a warning signal; a key matrix 10 for detecting an entry of the application entry keys 2a as well as the other keys; and a back-up power source 11 for the RAM 5.

Figure 3:
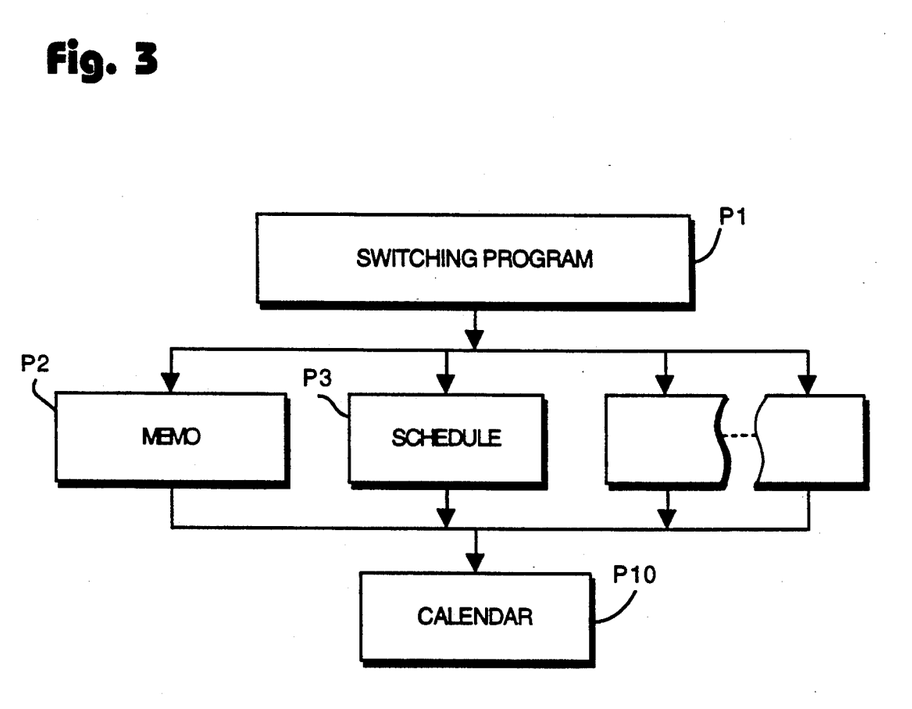
FIG. 3 is a diagram showing a calling relationship between applications in a first example of the present invention.

FIG. 3 shows an exemplary calling relationship between applications stored in the ROM 4 of an electronic organizer of the present invention. Any applications, such as a memo application P2 and schedule application P3, except a calendar application P10 are subordinate to a switching program P1. The calendar application P10 is subordinate to each of the other applications. Specifically, the switching program P1 selectively calls one of the applications except the calendar application P10. Each of the applications except the calendar application P10 can call the calendar application P10, if necessary.

The applications except the calendar application P10, such as the memo application P2 and the schedule application P3, calls key input subroutines repeatedly if they need key inputs. The lowest key input subroutine actually reads an I/O port for the input key and makes a key code. The calendar application P10 is not an independent application and is incorporated as one of the key input subroutines.

Figure 4:
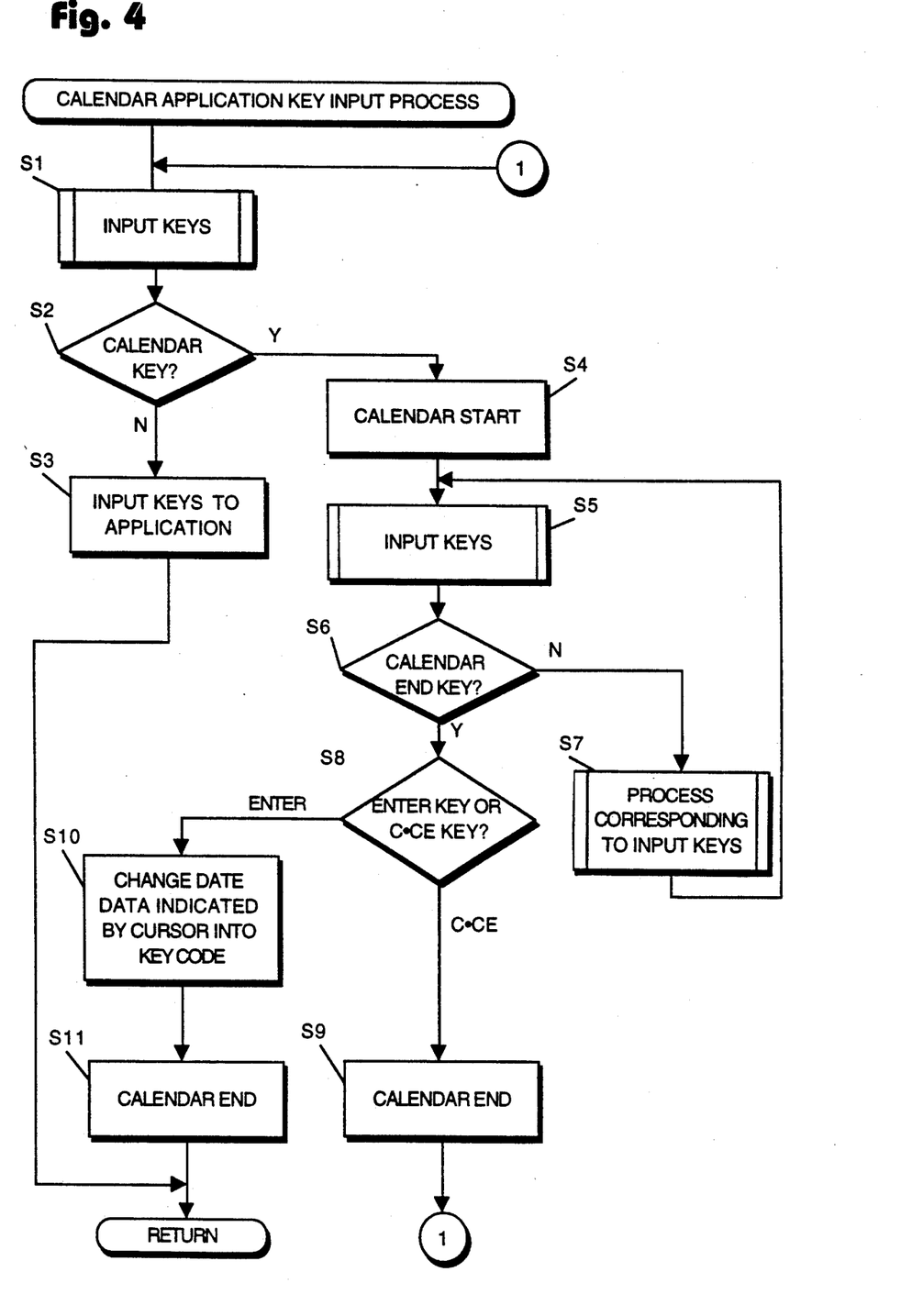
FIG. 4 is a flowchart showing a process of the calendar application as a key input subroutine in the first example of the present invention.

FIG. 4 shows a process of the calendar application as a key input subroutine executed under the control of the CPU 3.

Figure 5:
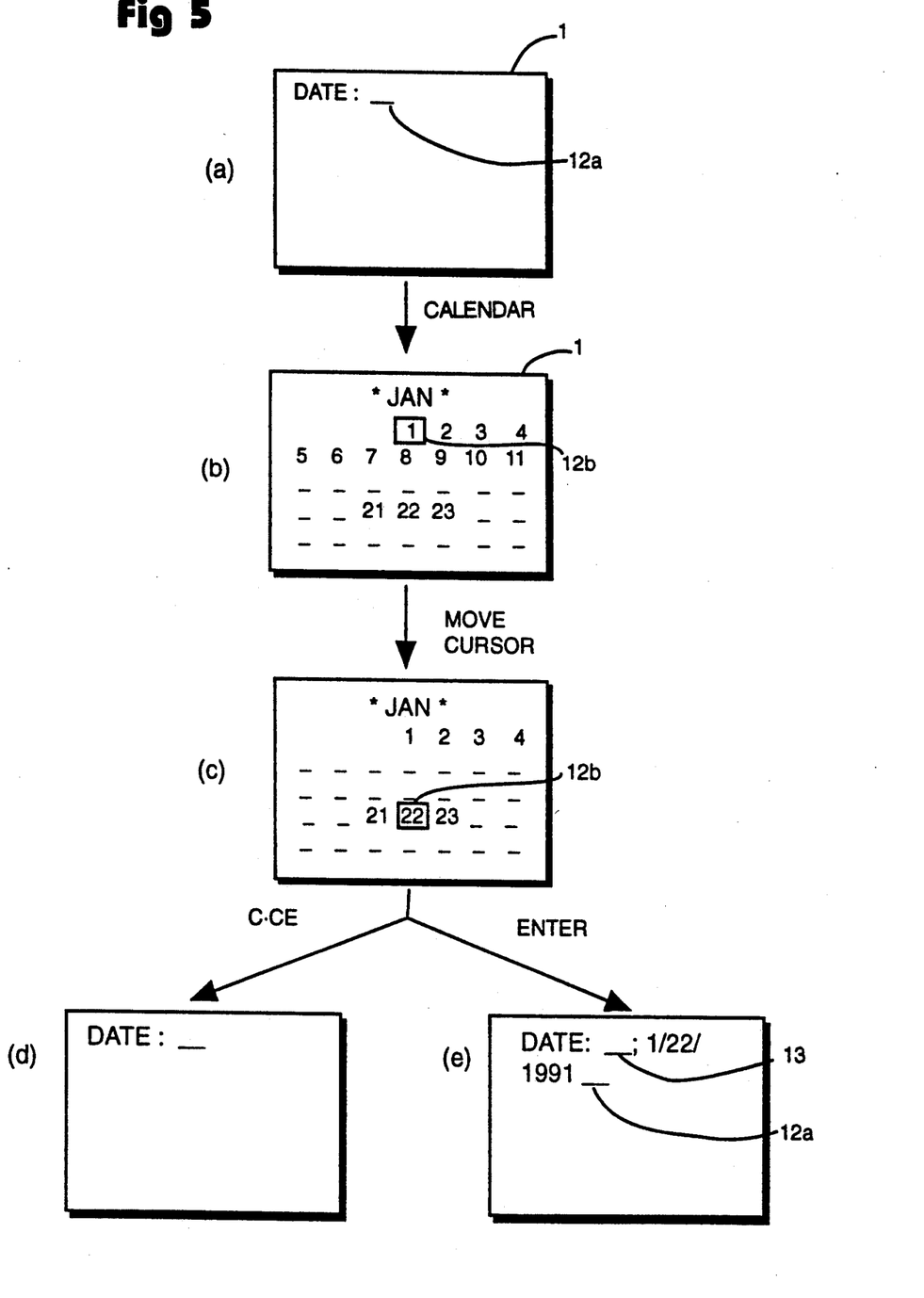
FIG. 5 is a diagram showing information displayed on a display portion in the first example of the present invention.

FIG. 5 shows a process through which information displayed on the display portion 1 of the electric organizer is changed according to an instruction of an operator.

The method of utilizing date data from the calendar application as a key input to one of the other applications is explained referring to FIG. 4 and FIG. 5 as follows:

Referring to FIG. 5(a), "DATE:" is displayed on the display portion 1 of the electronic organizer in operating one of the applications, such as the memo application P2. The wording "DATE:" may be replaced by other wordings. A cursor 12a indicates a position capable of receiving a key input from an operator. Then, the operator can select one of two input methods. One input method is an ordinary input method. Specifically, if the operator depresses the key "A", "A" is input to the position indicated by the cursor 12a. Another input method is for inputting data data from the calendar application, which is described below in detail.

Referring to FIG. 4, assuming that this key input subroutine is called by the memo application. This key input subroutine may be called by the other application. The CPU 3 allows an operator to input keys (step S1) and judges whether the CALENDAR key 2a₁ is input or not (step S2). If No in step S2, the keys input in step S1 are input to the memo application (step S3). For example, if the key "A" is input, "A" is input to the memo application. The process including steps S1, S2 and S3 is the same as the conventional process.

If Yes as in step S2, the CPU 3 starts up the calendar application (step S4). Then, a calendar is displayed on the display portion 1, as shown in FIG. 5(b). The CPU 3 allows the operator to input keys (step S5).

According to keys input in step S5, a desired portion of the calendar is displayed on the display portion 1, which scrolls up, down, left and right, and the position of a cursor 12b is moved to indicate the desired date to be input to the memo application, as shown in FIG. 5(c).

Referring back to FIG. 4, the CPU 3 judges whether a calendar end key is input or not (step S6). The calendar end key is either the ENTER key 2d or the C·CE key 2g. If No as in step S6, a process corresponding to the keys input in step S5 is executed (step S7). If Yes as in step S6, the CPU 3 judges which one of the keys ENTER 2d or the C·CE key 2g is input (step S8).

If the CPU 3 judges in step S8 that the C·CE key 2g is input, the CPU 3 terminates the calendar application (step S9) and returns to step S1. Then, "DATE:" is displayed on the display portion 1, as shown in FIG. 5(d). This means a state of the process returns back to the state shown in FIG. 5(a). Thus, by depressing the C·CE key 2g the operator can cancel the input date data to the calling application. The C·CE key 2g is also used when the operator wants to ensure only a day of the week of the data date and/or schedule and does not want to input the date data to the calling application.

If the CPU 3 judges in step S8 that the ENTER key 2d is input, the CPU 3 changes the date data indicated by the cursor 12b into a key code (step S10), terminates the calendar application (step S11), and returns to the calling application. The key code is inserted to a position indicated by the cursor 12a in FIG. 5(a). As a result, "DATE: Jan. 22, 1991" is displayed on the display portion 1, as shown in FIG. 5(e).

For example, the calendar application P10 is started by depressing the CALENDAR key 2a₁ in operating the memo application, and the data data "Jan. 22, 1991" is selected from the calendar by the cursor 12b. Then, when the ENTER key 2d is depressed, the date data is changed into a key code "_Jan. 22, 1991" as a display format and the key code "_Jan. 22, 1991" is input to the memo application. The "_" indicates a space 13.

The same result can be achieved from the state of FIG. 5(a), if the keys are successively entered in the order of "SPACE", "1", "/", "2", "2", "/", "1", "9", "9", and "1" through the steps S1, S2 and S3 as in FIG. 4.

Example 2

Figure 6:
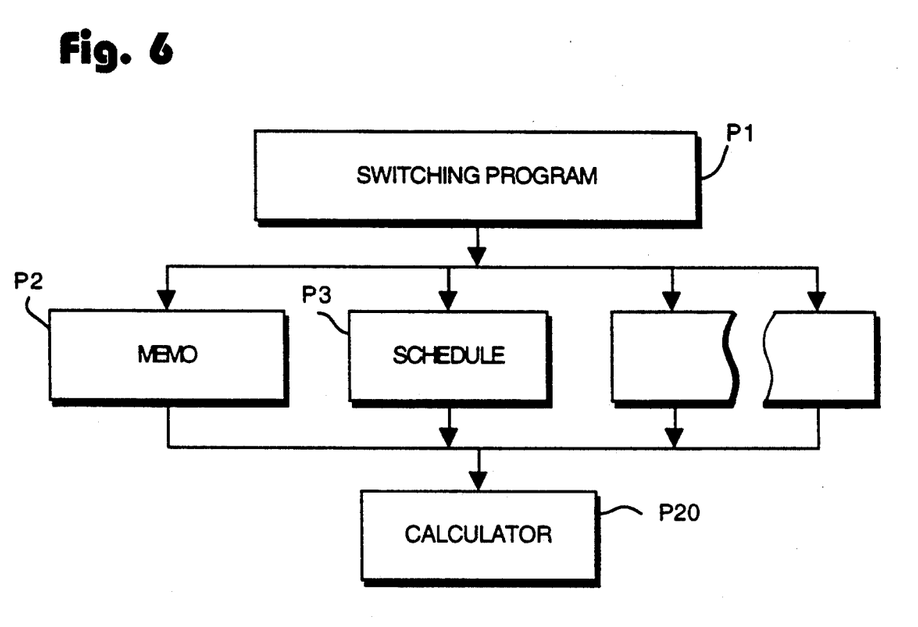
FIG. 6 is a diagram showing a calling relationship between applications in a second example of the present invention.

FIG. 6 shows an exemplary calling relationship between applications stored in the ROM 4 of an electronic organizer of the present invention. Any applications, such as a memo application P2 and schedule application P3, except a calculator application P20 are subordinate to a switching program P1. The calculator application P20 is subordinate to each of the other applications. Specifically, the switching program P1 selectively calls one of the applications except the calculator application P20. Each of the applications except the calculator application P20 can call the calculator application P20, if necessary.

The applications except the calculator application P20, such as the memo application P2 and the schedule application P3, calls key input subroutines repeatedly if they need key inputs. The lowest key input subroutine actually reads an I/O port for input key and makes a key code. The calculator application P20 is not an independent application and is incorporated as one of the key input subroutines.

Figure 7:
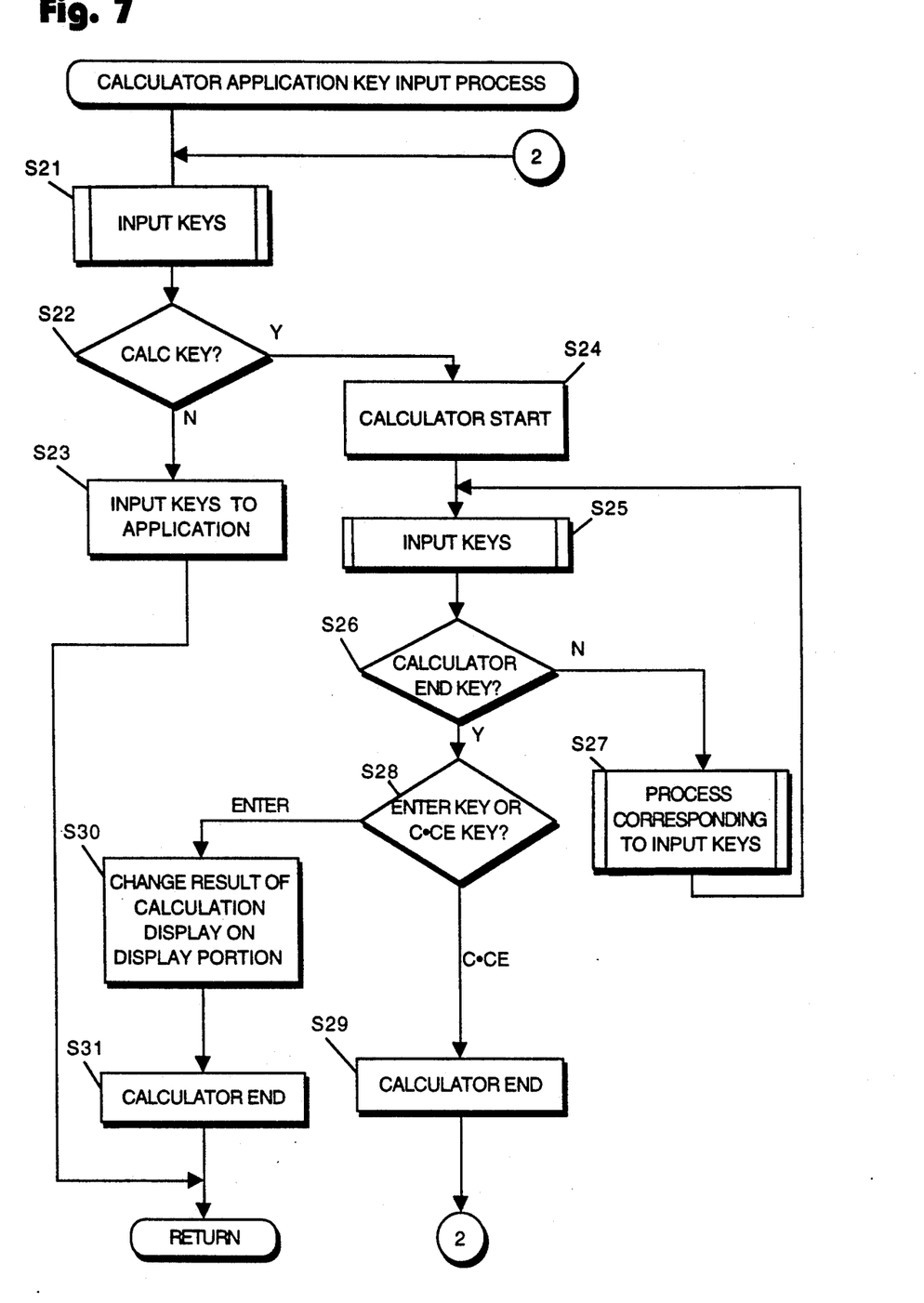
FIG. 7 is a flowchart showing the process of the calculator application as a key input subroutine in the second example of the present invention.

FIG. 7 shows a process of the calculator application as a key input subroutine executed under the control of the CPU 3.

Figure 8:
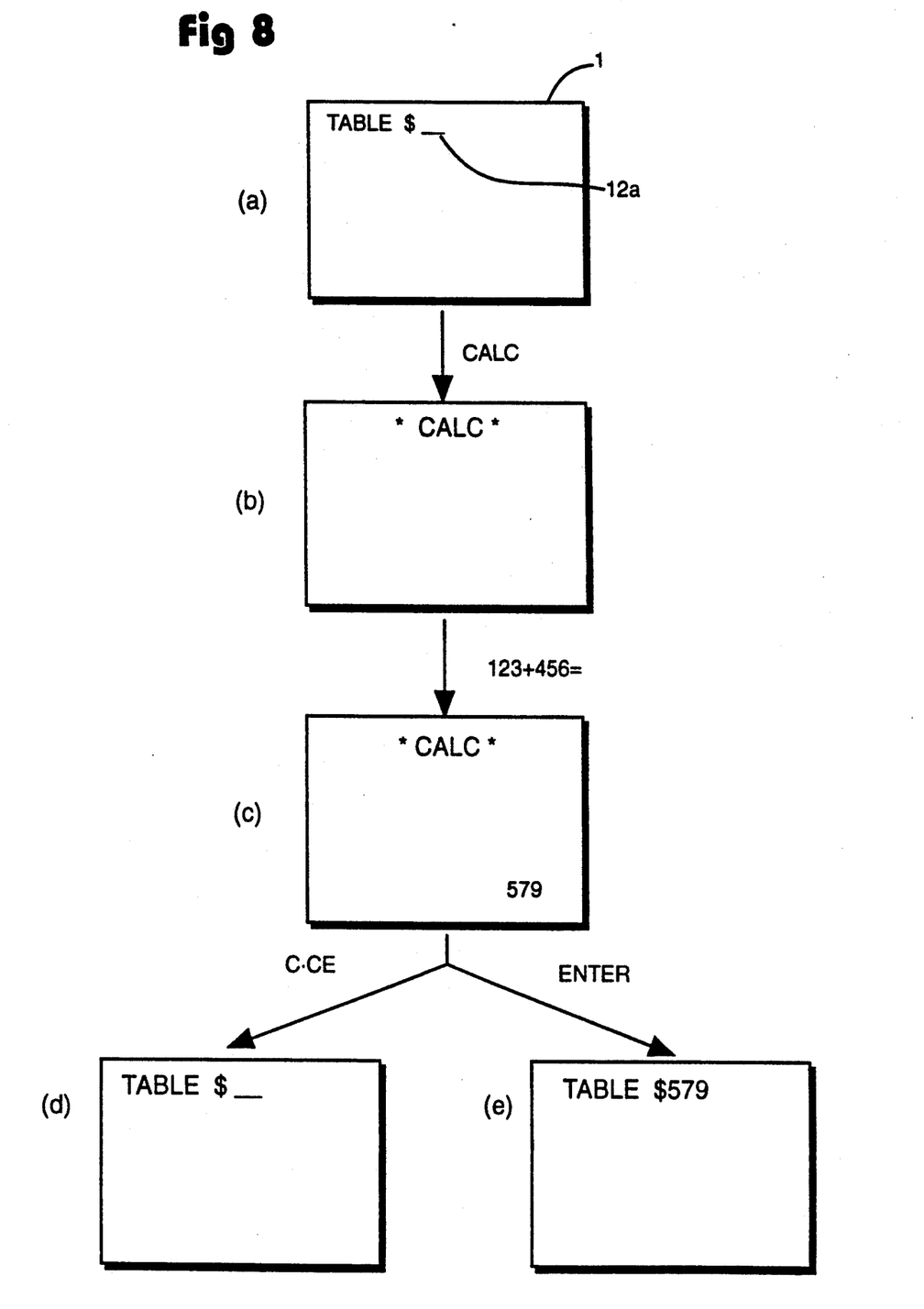
FIG. 8 is a diagram showing information displayed on a display portion in the second example of the present invention.

FIG. 8 shows a process through which information displayed on the display portion 1 of the electric organizer is changed according to instructions of an operator.

The method of utilizing a result of calculation obtained by the calculator application as a key input to one of the other applications is explained referring to FIG. 7 and FIG. 8 as follows:

Referring to FIG. 8(a), "TABLE $" is displayed on the display portion 1 of the electronic organizer in operating one of the applications, such as memo application P2. The wording "TABLE $" may be replaced by other wordings. A cursor 12a indicates a position capable of receiving a key input from an operator. Then, the operator can select one of two input methods. One input method is an ordinary input method. Specifically, if the operator depresses the key "A", "A" is input to the position indicated by the cursor 12a. Another input method is a method for inputting a result of a calculation obtained by the calculation application, which is described below in detail.

Referring to FIG. 7, assuming that this key input subroutine is called by the memo application, this key input subroutine may be called by the other applications. The CPU 3 allows an operator to input keys (step S21) and judges whether the CALC key $2a_5$ is input or not (step S22). If No as in step S22, the keys input in step S21 are input to the memo application (step S23). For example, if the key "A" is input, "A" is input to the memo application. The process including steps S21, S22 and S23 is the same as the conventional process.

If Yes as in step S22, the CPU 3 starts up the calculator application P20 (step S24). Then, "*CALC*" indicating a calculation mode and a value 0 are displayed on the display portion 1, as shown in FIG. 8(b). The CPU 3 allows the operator to input keys, such as number entry keys 2b, arithmetic function keys 2h, and memory keys 2i (step S25).

The CPU 3 judges whether a calculator end key is input or not (step S26). The calculator end key is either the ENTER key 2d or the C·CE key 2g. If No as in step S26, a process corresponding to the keys input in step S25 is executed (step S27). If Yes as in step S26, the CPU 3 judges which key, the ENTER key 2d or the C·CE key 2g, is input (step S28).

According to keys input in step S25, a desired calculation is made in step S27. For example, if keys are successively entered in the order of "1", "2", "3", "+", "4", "5", "6", and "=" in step S25, the calculation "123+456=" is made in step S27, and the result of the calculation, 579, is displayed on the display portion 1, as shown in FIG. 8(c).

If the CPU 3 judges in step S28 that the C·CE key 2g is input, the CPU 3 terminates the calculator application (step S29) and returns to step S21. Then, "TABLE $" is displayed on the display portion 1, as shown in FIG. 8(d). This means a state of the process returns back to the state shown in FIG. 8(a). Thus, by depressing the C·CE key 3g the operator can cancel the input data data to the calling application. The C·CE key 2g is also used when the operator wants to ensure only a result of a calculation and does not want to input the result of calculation to the calling application.

If the CPU 3 judges in step S28 that the ENTER key 2d is input, the CPU 3 changes the result of calculation displayed on the display portion 1 (a current display value) into a key code (step S30), terminates the calculator application (step S31) and returns to the calling application. The key code is inserted to a position indicated by the cursor 12a in FIG. 8(a). As a result, "TABLE $569" is displayed on the display portion 1, as shown in FIG. 8(e).

For example, the calculator application P20 is started by depressing the CALC key $2a_5$ in operating the memo application. A calculation "123+456=" is made by the calculator application P20, and the result of the calculation "579" is displayed on the display portion 1. Then, when the ENTER key 2d is depressed, the result of the calculation "579" is changed into a key code and input to the memo application.

The same result can be achieved from the state of FIG. 8(a), if the keys are successively entered in the order of "5", "7", and "9" through the steps S21, S22 and S23 as in FIG. 7.

The electronic organizer of the present invention includes a ROM 4 for storing a calendar application and a calculator application. The calendar application and the calculator application are not independent applications and are subordinate to the other applications. Specifically, the calendar application and the calculator application are incorporated in a key input subroutine of the other applications as a front-end processor. The front-end processor functions as a processor for inputting a key input, processing the key input, and outputting the processed result.

Accordingly, the electronic organizer allows the operator to select either the calender application or the calculator application at any time in operating the other applications. Thus, no matter which application is in a state for inputting data, the operator may refer a desired data from the calendar application and input it to the other application in the state for inputting data. The operator may also refer a desired result of calculation from the calculator application and input it to the other application in the state for inputting data.

Further, since the electronic organizer returns back to the state for inputting data of the calling application after the calendar application or the calculator application is finished, the operator can continue to input data.

According to the present invention, the operator can directly refer to and/or use a calendar and/or a result of a calculation at any time. In addition, the operator can utilize data data from the calculator application and/or a result of calculation obtained by the calculator application as a key input to one of the other applications. Thus, it is easier to continue to input data and the versatility of the electronic apparatus is enhanced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A portable electronic apparatus comprising, in combination:

display means having a display portion;

memory means for storing a plurality of application programs and a calendar application program and;

processing means for;

specifying a position indicated by a cursor displayed on said display portion of said display means while operating one of said plurality of application programs stored in said memory means, for starting up said calendar application program stored in said memory means while operating one of said plurality of application programs, for displaying a calendar which includes a plurality of date data on said display portion while operating said calendar application program, for selecting one of said plurality of date data of said calendar, and for displaying said selected date data of the calendar at said specified position indicated by said cursor on said display portion.

2. The portable electronic apparatus according to claim 1, wherein said calendar application program is incorporated in a key input subroutine of each of said plurality of application programs.

3. A portable electronic apparatus comprising, in combination:

display means having a display portion;

memory means for storing a plurality of application programs and a calculator application program and;

processing means for specifying a position indicated by a cursor displayed on said display portion of said display means while operating one of said plurality of application programs stored in said memory means,     for starting up said calculator application program stored in said memory means while operating one of said plurality of application programs,     for displaying a result of a calculation obtained by said calculator application program on said display portion, and     for displaying said result of said calculation at said specified position indicated by said cursor on said display portion.

4. The portable electronic apparatus according to claim 3, wherein said calculator application program is incorporated in a key input subroutine of each of said plurality of application programs.

* * * * *